Jan. 3, 1933.  G. H. SCHIEFERSTEIN  1,892,968
METHOD OF AND MEANS FOR IMPROVEMENTS IN MECHANICAL OSCILLATORS
Filed Feb. 20, 1930
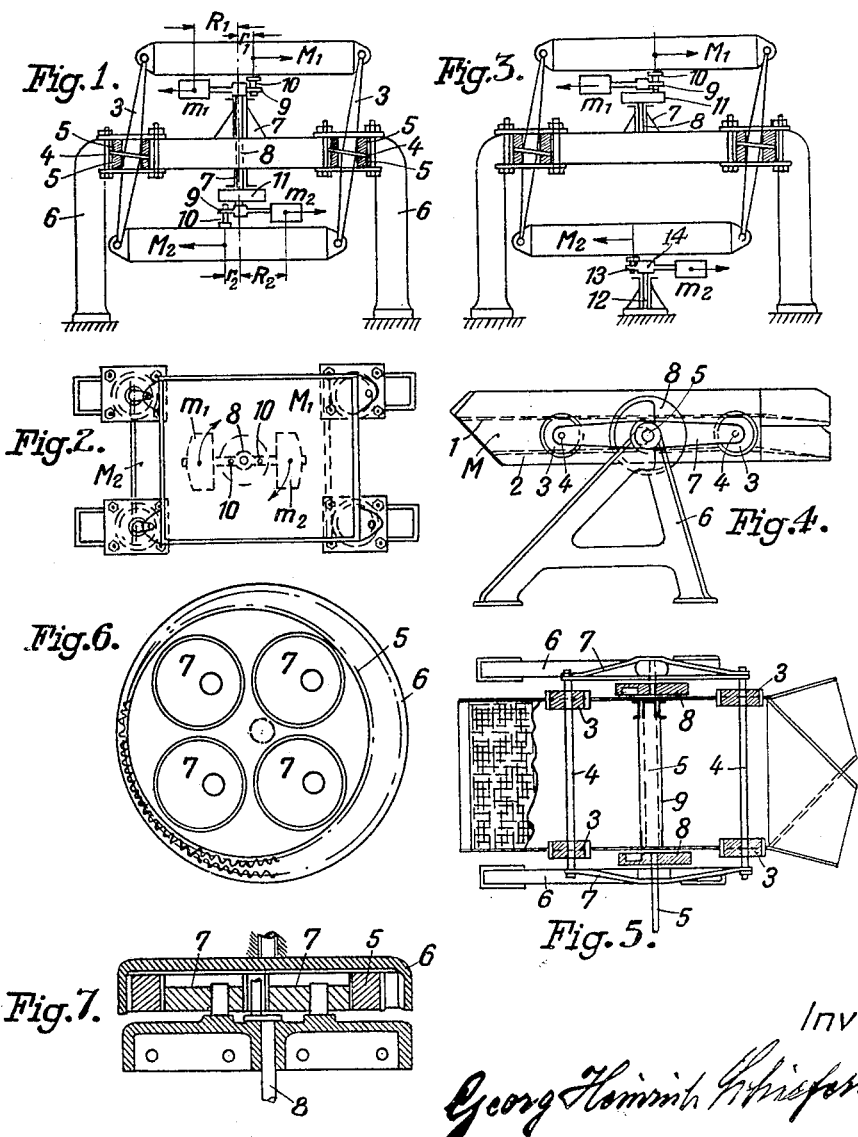
Inventor:
Georg Heinrich Schieferstein Patented Jan. 3, 1933

1,892,968

UNITED STATES PATENT OFFICE

GEORG HEINRICH SCHIEFERSTEIN, OF BERLIN-CHARLOTTENBURG, GERMANY

METHOD OF AND MEANS FOR IMPROVEMENTS IN MECHANICAL OSCILLATORS

Application filed February 20, 1930, Serial No. 430,090, and in Germany November 11, 1929.

This invention relates to apparatus for carrying out mechanical rotary oscillations for the transmission of energy.

The object of the invention is the construction of an apparatus in which one or more bodies are connected between yieldable means in such a manner that all parts of the body or bodies are made to described rotary oscillations by means of cranks or eccentrics and in which the yieldable means are tensioned in front of the cranks or eccentrics. In this manner a potential energy is stored up in any position of movement of the apparatus as well as in a position of rest, the degree of stored energy being determined by the formula $$\frac{Po \cdot f}{2}$$

in which $Po$ is the active directional force of the yieldable means and $f$ is the stroke of the oscillation.

A further object of the invention is to construct such an oscillating apparatus that at all oscillation frequencies a constant stroke is described whereas the cranks or eccentrics are relieved of the greater part of the centrifugal forces of the bodies while swinging in any direction. In the starting of the apparatus the centrifugal forces are smaller than the directional forces of the elastic means, after increasing the frequency of the rotational oscillations these forces will become equal and at a further increase of the frequency the centrifugal forces exceed the said directional forces and call for a compensating reactionary force. The accumulated kinetic energy of the oscillating bodies rises and falls in proportion to the speed of revolution or the frequency of the oscillations.

A further object is to provide the apparatus with a means for equalizing the forces at any frequency of oscillation, so as to prevent vibration and knocking on the base supports and frame work. A particular advantage lies therein that the various portions of the oscillating masses may move in oblique, vertical, horizontal or any other desired planes.

In the adoption of such a rotary oscillation describing apparatus for the transmission of energy in gears, gear drives of high efficiency are obtained, which even at large gear ratios show no self-binding action such as are known in worm gearing and consequently may be used in both directions for high velocity power transmission in power drives.

The accompanying drawing illustrates various examples of adaptations and modifications of the invention, which may be referred to as a part of the specification and in which:

Fig. 1 is a side elevational view, partially in section, illustrating a horizontal mechanical oscillator;

Fig. 2 is a top plan view of the device shown in Fig. 1;

Fig. 3 is a side elevational view, partially in section, of a modified form of the horizontal mechanical oscillator shown in Fig. 1;

Fig. 4 is a side elevational view of another modification of a mechanical oscillator;

Fig. 5 is a top plan view, partially in section, of the mechanical oscillator shown in Fig. 4;

Fig. 6 is a diagrammatic illustration of an oscillatory drive gearing; and

Fig. 7 is a sectional view of the oscillatory drive gearing as illustrated in Fig. 6.

A practical application of the invention is illustrated by the embodiments represented in Figs. 1 to 3 of the accompanying drawing.

In said figures, M' and M² are oscillating masses, which may, for example, take the form of a coal-screening plant. Said masses are mounted, in known manner, on four rocking arms 3, 3, each of which is provided with an annular disc 4 retained in central position by rubber rings 5. Thus the elastic means act as rectifying forces opposing an elastic resistance to any deflection from the central position by means of the opposing directional rectifying forces Po, and accumulate a potential energy. The degree of potential energy accumulated is dependent upon the degree of deflection $f$ from its central position and may be determined by the product $$\frac{Po \cdot f}{2}.$$

In the centre of the supporting frame 6 are the rigidly mounted throat bearings 7, 7, in which the shaft 8 is caused to revolve by the belt pulley 11 or other known means. At each end of this shaft is a crank 9, carrying on its linear extension a mass $m'$ $(m^2)$. The radius $R'$ measured from the centre of gravity of the mass $m'$ bears the same relation to the radius $r'$ of the crank, as the mass $M'$ does to the mass $m'$; and the same applies to the other side of the drive, so that $$\frac{R^2}{r^2} = \frac{M^2}{m^2}.$$

Of course, on the driving mechanism being removed, the crank pins 10 are adjusted, by the elastic means 5, 5 acting as rectifying forces, in such a way that they coincide with the common central axis. On the other hand, the application of the driving mechanism deflects the crank pins 10 from the centre through the radius $r$, and consequently the elastic means 5 are subjected to a static preliminary tension corresponding to the full value of the deflection. This is to say, the potential energy $$\frac{Po \cdot f}{2}$$

is stored up in the elastic means; whilst, on the other hand, the dextro-rotary couple of the oscilliating masses $M'$ and $M^2$—indicated by arrows in Fig. 3—is completely balanced by a levo-rotary couple $m'$ and $m^2$, provided the two, when reduced to a common distance from their point of application, fulfill the condition that $$m' \cdot R = M' \cdot r' \text{ or } m^2 \cdot R^2 = M^2 \cdot r^2;$$

that is, the machine is now completely balanced in itself, in relation to forces and masses, at any desired speed. The machine is driven through the belt pulley 11, or in any other known manner.

Fig. 3 represents a combination with the same fundamental idea, except that only the one half—i. e. the mass $M'$—of the screen is actuated by its belt pulley 11, or shaft 8, whereas the shaft 12, or mass $m^2$ connected to the crank pin 13 by means of the crank 14 is carried along by the mass $M^2$, for the sole purpose of inertia balance and preliminary tension, with a phase displacement of 180°.

The essence of the invention will not be affected by the removal of the upper or lower portion of the screen, that is to say, for example, the masses $M^2$ and $m^2$, together with the lower portion of all the swing supports, since each half is self-sufficient as regards inertia balance and drive.

Moreover, the elastic means may be employed in any other known arrangement, or composed of any other suitable elastic material, such as flexible metals, tombac, steel etc.

Another embodiment of the invention is represented in Figs. 4 and 5 of the accompanying drawing. In contrast to the modification of Figs. 1 to 3, which describes horizontal circular oscillations, the circular oscillations of Figs. 4 and 5 are vertical.

In said latter figures M denotes a box screen, equipped with two screens 1 and 2, and mounted on shafts 4 in four elastic, rubber-filled bearings 3, 3. The rubber rings, which exhibit the same elasticity in all directions, enable the mass M to describe circular oscillations in vertical planes, about its centre of gravity. The driving shaft 5, which is provided with two eccentrics, is passed through the centre of gravity of the screen, between 1 and 2, the two outer ends being mounted axially in the brackets 6, 6 and the two eccentrics in the centre of gravity of the screen. The bearing shafts 4, 4 of the screen are secured in two common yokes 7, which in turn are mounted on the brackets 6. Thus, during the rotation of the eccentric shafts 5, each individual point of the box screen M must describe a circle corresponding to the eccentricity of the shaft.

In the neutral position, however, the screen is displaced out of its central position by the radius of the eccentric, and the elastic bearing is subjected to a corresponding initial tension. The balancing of the masses is then effected by the two unbalanced weight devices 8, 8, which are offset by 180° in relation to the eccentrics of the shaft 5. In this case again, the mass $m^2$, at the centre of gravity of the unbalance, behaves in relation to M, in the same manner as the eccentric radius $r$ does in relation to the radius of the centre of gravity of the unbalance R. The shaft 5, passing through the centre of gravity of the screen, is surrounded, inside the box M, by a tube 9, which makes a close fit with the two screens and protects the shaft from dust inside the box.

The invention is not affected if the rotary balance masses be replaced, in known manner, by a mass oscillating with a phase displacement of 180°. Moreover, the known fact that elliptical oscillations are set up by energizing the described system asymmetrically, does not affect the invention.

It is of importance to the course of the oscillations that the elastic points of support should coincide with the plane of gravity of the screen, and that the energizing shaft should, if possible, act in or in the immediate vicinity of said axis.

In the present instance, this problem is solved, in Figs. 1, 2 and 3 by mounting the driving shaft and bearings on the periphery of the two screens.

In Figs. 4 and 5, the supporting shafts and the driving shafts are carried through the box, and the former are shut off, in relation to the outside, by their own rubber bearings, whereas the driving shaft, which shares the movements of the box, does not require any special packing, and is merely protected from dust, inside the box, by a special tube 9.

Each of Figs. 6 and 7 represents an embodiment in which the oscillating mass is designed as a member for the mechanical transmission of energy, in this instance as a pinion 5 gearing inside a second pinion 6. The pinion 5 is cushioned between a plurality of elastic members 7 and is driven by means of a revolving crank 8. Since, on the one hand, the pinion 5 does not rotate, but, on the other hand, has a smaller pitch radius than the pinion 6, it follows that, at each circular oscillation of the pinion 5, the pinion 6 must necessarily advance, in the direction of the oscillation, by the difference between the two pitch radii. The arrangement shown therefore represents a gear with a constant and relatively high transmission ratio.

Since, in contrast with worm gearing, etc., having the same properties with regard to transmission, this gear does not exhibit any sliding friction, but merely a rolling movement, it is not self-jamming or self-binding, even with relatively high transmission ratios, and is therefore reversible. Hence, the pinion 6 may also act as the driving member, and 5 as the driven member.

The potential energy is taken up by the rubber rings 7, 7 which, at the same time, prevent the driving pinion from rotating, whilst leaving a slight phase displacement between the two pinions. In order to obviate this phase displacement as well, the driving pinion may be articulated to a fixed point, by means of a universal joint, so that it can oscillate, but not revolve. In such case, a single, centrally disposed rubber ring suffices to taken up the potential energy.

When the elastic means is subjected to an asymmetrical initial tension, for the purpose of obtaining special effects, the invention is, of course, uneffected.

Having now particularly described and ascertained the nature of my said invention and in what manner the same is to be performed, I declare that what I claim is:—

1. Apparatus describing mechanical circular oscillations consisting of an eccentric or crankshaft, of a mass and of elastic means accumulating potential energy and initially tensioned about the eccentric or crank thrust.

2. Apparatus describing mechanical circular oscillations consisting of an eccentric or crankshaft, of a mass and of elastic means accumulating potential energy, and initially tensioned about the eccentric or crank thrust, whereby the individual means are so arranged with respect to each other that the potential energy $$\frac{P_o \cdot f}{2}$$

is stored up in the elastic means in the operative state, as well as in any desired rotational or oscillating rate.

3. Apparatus describing mechanical circular oscillations consisting of an eccentric or crankshaft, of a mass and of elastic means accumulating potential energy, and initially tensioned about the eccentric or crank thrust, whereby the individual means are so arranged with respect to each other that the potential energy $$\frac{P_o \cdot f}{2}$$

is stored up in the elastic means in the operative state, as well as in any desired rotational or oscillating rate, and that, with increasing rotational or oscillating rate, the centrifugal force increases instead of the initial tension force, finally replaces it entirely and on further rotational increase produces a reaction force of reverse form in the crank.

4. Apparatus describing mechanical circular oscillations consisting of an eccentric or crankshaft, of a mass and of elastic means accumulating potential energy, and initially tensioned about the eccentric or crank thrust, whereby the individual means are so arranged with respect to each other that the potential energy $$\frac{P_o \cdot f}{2}$$

is stored up in the elastic means in the operative state, as well as in any desired rotational or oscillating rate, and that, with increasing rotational or oscillating rate, the centrifugal force increases instead of the initial tension force, finally replaces it entirely and on further rotational increase produces a reaction force of reverse form in the crank, and with constant potential energy the kinetic energy rises and falls with the rotation or oscillation rate.

5. Apparatus describing mechanical circular oscillations consisting of an eccentric or crankshaft, of a mass and of elastic means accumulating potential energy, and initially tensioned about the eccentric or crank thrust, whereby the individual means are so arranged with respect to each other that the potential energy $$\frac{Po \cdot f}{2}$$

is stored up in the elastic means in the operative state, as well as in any desired rotational or oscillating rate, and that, with increasing rotational or oscillating rate, the centrifugal force increases instead of the initial tension force, finally replaces it entirely and on further rotational increase produces a reaction force of reverse form in the crank, and with constant potential energy the kinetic energy rises and falls with the rotation or oscillation rate, and the travel of the oscillating system remains constant and the force or mass equilibrium is retained at all rates of rotation.

6. Apparatus describing mechanical circular oscillations consisting of an eccentric or crankshaft, of a mass and of elastic means accumulating potential energy, and initially tensioned about the eccentric or crank thrust, whereby the individual means are so arranged with respect to each other than the potential energy $$\frac{Po \cdot f}{2}$$

is stored up and the mass is so mounted between the elastic means that its center of gravity can swing within a flat or curved surface in the direction of any desired ratios.

7. Apparatus describing mechanical circular oscillations consisting of an eccentric or crankshaft, of a mass and of elastic means accumulating potential energy and initially tensioned about the eccentric or crank thrust, and a mass rotating with 180° phase displacement which is capable of counterbalancing the moved members with respect to force and mass action.

9. Apparatus describing mechanical circular oscillations consisting of an eccentric or crankshaft, of a mass and of elastic means accumulating potential energy and initially tensioned about the eccentric or crank thrust, and a mass rotating with 180° phase displacement which is capable of counterbalancing the moved members with respect to force and mass action, and of the arrangement of a drive common for a plurality of oscillating mass, whereby the indirectly excited masses themselves set their corresponding compensating means in rotation.

9. Apparatus describing mechanical circular oscillations consisting of an eccentric or crankshaft, of a mass and of elastic means accumulating potential energy and initially tensioned about the eccentric or crank thrust, and a mass rotating with 180° phase displacement which is capable of counterbalancing the moved members with respect to force and mass action, and of the arrangement of a drive for each oscillating mass which is correspondingly moved in the phase.

10. Apparatus describing mechanical circular oscillations consisting of an eccentric or crankshaft, elastic means initially tensioned about the eccentric or crank thrust and accumulating potential energy and between the elastic means there is mounted a mass which serves as a member for the mechanical transmission of efficiency (power) formed for examples as a thrust wheel, and which rolls off a second wheel.

In testimony whereof I affix my signature.
GEORG HEINRICH SCHIEFERSTEIN.